(12) United States Patent
Abhishek et al.

(10) Patent No.: US 7,440,728 B2
(45) Date of Patent: Oct. 21, 2008

(54) USE OF SEPARATE CONTROL CHANNEL TO MITIGATE INTERFERENCE PROBLEMS IN WIRELESS NETWORKING

(75) Inventors: Abhishek Abhishek, Woodinville, WA (US); Craig J. Mundie, Seattle, WA (US); Poovanpilli G. Madhavan, Bellevue, WA (US); Victoria M. Poncini, Renton, WA (US); William J. Westerinen, Sammamish, WA (US); Paramvir Bahl, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 362 days.

(21) Appl. No.: 11/004,600

(22) Filed: Dec. 3, 2004

(65) Prior Publication Data

US 2006/0121854 A1   Jun. 8, 2006

(51) Int. Cl.
    *H04B 7/00* (2006.01)
(52) U.S. Cl. .................... 455/41.2; 455/434; 455/450; 455/452.1; 455/62; 455/63.1
(58) Field of Classification Search ................ 455/434, 455/450, 452.1, 62, 63.1, 63.3, 63
    See application file for complete search history.

(56) References Cited

U.S. PATENT DOCUMENTS

| | | | | |
|---|---|---|---|---|
| 3,976,981 | A * | 8/1976 | Bowden | 700/10 |
| 6,473,410 | B1 * | 10/2002 | Sakoda et al. | 370/330 |
| 6,628,626 | B1 * | 9/2003 | Nordgaard et al. | 370/277 |
| 6,999,438 | B2 * | 2/2006 | Nounin et al. | 370/332 |
| 7,027,827 | B2 * | 4/2006 | Bonta et al. | 455/502 |
| 7,035,593 | B2 | 4/2006 | Miller | |
| 7,079,812 | B2 | 7/2006 | Miller | |
| 7,116,943 | B2 | 10/2006 | Sugar | |
| 7,127,250 | B2 * | 10/2006 | Gallagher et al. | 455/436 |

(Continued)

FOREIGN PATENT DOCUMENTS

EP        1065897        1/2001

(Continued)

OTHER PUBLICATIONS

Office Action dated Feb. 5, 2008 cited in related U.S. Appl. No. 11/004,288.

(Continued)

*Primary Examiner*—Matthew Anderson
*Assistant Examiner*—April S Guzman
(74) *Attorney, Agent, or Firm*—Workman Nydegger

(57) ABSTRACT

Described is a system and method for transporting interference-related control data and other information between nodes in a wireless network, using a control channel that is distinct from a content channel used to transport content. The control channel may be a different channel in the same unlicensed band as the content channel, a channel in a different unlicensed band, or a channel in a licensed band, and thereby not subject to the same interference-related problems that the unlicensed content channel may experience. As a result, management information for adjusting the content channel's communication parameters may still be communicated between the nodes, whereby mitigation actions may occur. For example, the content channel may be changed to another frequency, compression may be implemented or varied, and/or the data transfer rate may be varied. The control data can also be used to change the control channel's communication parameters.

20 Claims, 12 Drawing Sheets

U.S. PATENT DOCUMENTS

| | | | |
|---|---|---|---|
| 7,167,708 B2 * | 1/2007 | Backes et al. | 455/434 |
| 7,254,372 B2 * | 8/2007 | Janusz et al. | 455/88 |
| 2002/0173271 A1 | 11/2002 | Blair et al. | |
| 2003/0119527 A1 * | 6/2003 | Labun et al. | 455/456 |
| 2003/0220079 A1 * | 11/2003 | Kikuma | 455/67.13 |
| 2004/0022223 A1 | 2/2004 | Billhartz | |
| 2004/0054774 A1 | 3/2004 | Barber et al. | |
| 2004/0077355 A1 * | 4/2004 | Krenik et al. | 455/450 |
| 2004/0077356 A1 * | 4/2004 | Krenik et al. | 455/450 |
| 2004/0147223 A1 * | 7/2004 | Cho | 455/41.2 |
| 2004/0192211 A1 * | 9/2004 | Gallagher et al. | 455/67.11 |
| 2004/0203461 A1 | 10/2004 | Hay | |
| 2004/0203737 A1 * | 10/2004 | Myhre et al. | 455/426.1 |
| 2004/0203800 A1 * | 10/2004 | Myhre et al. | 455/445 |
| 2004/0203815 A1 * | 10/2004 | Shoemake et al. | 455/450 |
| 2004/0240525 A1 * | 12/2004 | Karabinis et al. | 375/132 |
| 2005/0003827 A1 | 1/2005 | Whelan | |
| 2005/0021621 A1 * | 1/2005 | Welch et al. | 709/204 |
| 2005/0111383 A1 * | 5/2005 | Grob et al. | 370/254 |
| 2005/0143123 A1 * | 6/2005 | Black et al. | 455/552.1 |
| 2005/0157668 A1 * | 7/2005 | Sivan | 370/312 |
| 2005/0163071 A1 * | 7/2005 | Malladi et al. | 370/328 |
| 2005/0181823 A1 * | 8/2005 | Haartsen | 455/553.1 |
| 2005/0207395 A1 * | 9/2005 | Mohammed | 370/352 |
| 2005/0215197 A1 * | 9/2005 | Chen et al. | 455/41.2 |
| 2006/0120302 A1 | 6/2006 | Poncini | |
| 2006/0121853 A1 | 6/2006 | Madhavan | |
| 2006/0121854 A1 * | 6/2006 | Abhishek et al. | 455/63.1 |
| 2006/0217067 A1 | 9/2006 | Hellbig | |
| 2006/0251012 A1 * | 11/2006 | Hara et al. | 370/328 |
| 2006/0292986 A1 * | 12/2006 | Bitran et al. | 455/41.2 |

FOREIGN PATENT DOCUMENTS

EP 1411685 4/2004

OTHER PUBLICATIONS

Office Action dated Apr. 28, 2008 cited in related U.S. Appl. No. 11/004,428.

WO 2004/077724 A (Backes, Floyd; Autocell Laboratories, Inc; Bridge, Laura; Callahan, Paul) Sep. 2004,* p. 8, line 15-p. 10, line 4 *p. 11 , line 1-p. 13, line 13, *p. 14,, line 10-line 21 * 8 figures 1,3,14,16 *.

* cited by examiner

USE OF SEPARATE CONTROL CHANNEL TO MITIGATE INTERFERENCE PROBLEMS IN WIRELESS NETWORKING

CROSS-REFERENCE TO RELATED APPLICATIONS

The present invention is related to the following copending United States patent applications filed concurrently herewith, assigned to the assignee of the present invention, and hereby incorporated by reference in their entireties:

"Extensible Framework for Mitigating Interference Problems in Wireless Networking," U.S. patent application Ser. No. 11/004,288; and "Protocol for Exchanging Control Data to Mitigate Interference Problems in Wireless Networking," U.S. patent application Ser. No. 11/004,428.

FIELD OF THE INVENTION

The invention relates generally to radio frequency communications, and more particularly to controlling the communications in environments such as wireless computer networks.

BACKGROUND

Wireless local area networks (WLANs) are proliferating in both home and enterprises. Such wireless networks may be used for various types of content transfer, including web browsing, file transferring, audiovisual streaming, sending and receiving messages, and other purposes. As wireless connectivity spreads, the likelihood of radio frequency (RF) activity from other bands and overlaying bands used in wireless networking bands increases for any given location, resulting in interference for a greater percentage of wireless network users.

Further, because wireless networks operate in unlicensed bands in the 2.4 GHz and 5 GHz regions of the RF spectrum, many other RF devices transmit information (or noise) on these frequencies as well, causing interference to the WLAN communication. Examples of various sources and types of interference seen by a home wireless network may include microwave ovens, which cause slow periodic interference; cordless phones, which cause interference of a type referred to as "slow hopper;" a Bluetooth headset (causing fast hopper interference); digital spread spectrum (DSS) cordless phones, which cause constant custom waveform interference; and wireless surveillance cameras, which cause constant standard waveform interference. In addition, other nearby WLANs operating on the same channel, such as that of a neighbor, can cause interference.

As is understood, RF interference in wireless networking results in an effective reduction of available data rates and/or range, causing poor user experience. While a technically-knowledgeable user may be able to mitigate a regularly occurring interference problem by reconfiguring networking devices to operate on another channel, many of the sources of interference transmit intermittently, whereby even if one problem was solved by changing to another channel, another problem might arise that occurs intermittently, which is more difficult to detect and resolve.

What is needed is a solution that provides for a reasonably good wireless experience, including in the presence of RF interference. The solution should allow wireless communication mechanisms to dynamically adapt to adjust for interference even when the interference is preventing or severely impairing communications on the channel on which content is being exchanged.

SUMMARY OF THE INVENTION

Briefly, the present invention is directed towards a system and method for transporting interference-related control data and other information between two or more nodes in a wireless network, using a control channel that is separate from the content (main data) channel used to transport content. The control channel is typically one that is not subject to the same interference-related problems being experienced on the unlicensed content channel, at least with respect to the control data, which requires relatively little bandwidth. As a result, management information (e.g., interference-related data) and the like may still be communicated between nodes, such that the content communication can be dynamically varied in some way to mitigate or avoid the problems being caused by the interference. For example, to avoid or reduce the communication problems caused by interference on the content channel, via management information sent over the control channel, the content channel may be changed to another frequency, and/or compression of the data transfer rate may be varied to correspond to a narrowed amount of bandwidth due to the interference. Even when the content channel is experiencing substantial interference, via the separate control channel the interference information necessary for mitigation is normally able to be shared between wireless nodes.

Various alternatives for selecting a different control channel are feasible, including selecting the control channel as a different channel in the same unlicensed band as the content channel, selecting the control channel as a channel in a different band (e.g., a channel in the 5 GhZ band instead of in the 2.4 GHz band, or vice-versa), and/or using a channel in a licensed band. The use of a licensed band channel as the control channel for an unlicensed main data channel ensures that control information will not be interfered with by other RF sources (under ordinary circumstances). Note that while licensed band transports can be expensive, the communication of such control information requires relatively low bandwidth, helping lower the cost. For example, a relatively small amount of control data on a licensed band can be used to control large amounts of content data being transported on an unlicensed-band data network (such as an 802.11 WLAN).

Where the cost is not acceptable or a licensed band is not available, a different channel in an unlicensed band can be used instead. Note that because the bandwidth requirements are low and a different channel is being used for the control data, the control data is often able to be exchanged in the unlicensed band even when the unlicensed content channel is experiencing interference. The control data can also be used to change its own communication parameters, including changing to another frequency.

In one example implementation, the present invention leverages a framework through which mechanisms that monitor RF signals can work with other mechanisms to determine a solution for mitigating wireless network communication problems caused by RF interference. Such mechanisms include interference processing modules such as RF sensors, RF signature analysis systems and self-correcting software modules. In this example implementation, the framework for interconnecting such interference processing modules comprises a service operating on a computer system, referred to as a robust coexistence service, which is directed to allowing wireless networks to coexist with various other RF sources that would otherwise interfere with network communications.

The robust coexistence service (RCS) comprises a flexible and extensible framework including a local processing subsystem that allows spectrum sensor hardware to be plugged in so as to output data corresponding to sensed RF conditions, including any interference-related information. One or more software classifiers and application programs are also plugged into the framework to evaluate the sensed RF data, in order to provide the interference-related information, for informational purposes as well as for mitigating any interference-related communication problems.

In one implementation, a protocol provides for peer discovery, peer information exchange, and a transport mechanism used to deliver the protocol. According to the protocol, the locally-detected interference-related information is formatted, along with general environment information and the like, into the control data, which is then distributed over the control channel from the local node to a remote peer node in the wireless network that is RCS-enabled (running the robust coexistence service), whereby the remote node knows the local node's current RF environment. A similar exchange of control data occurs in the opposite direction. As a result, the peer nodes know each other's environments, and when any node transmits content (the main data) to a receiver node, the transmission can be adapted to avoid the interference, or mitigate the negative effects of the interference in some way. For example, if an access point knows that a device to which it is associated is experiencing interference on one channel, the access point and device can agree to switch to a different channel. Note that with an access point, each associated computing device has only the access point as its peer, while the access point has a peer relationship with each associated access point. In an ad hoc network, devices may have multiple peers.

To distribute the control data, each robust coexistence service also includes an information distribution subsystem. The information distribution subsystem includes a transport module that communicates the control data including any interference information locally-sensed at the computer system to another, remote node on the network, and receives similar information sensed remotely at that node. The transport module for communicating the control data may correspond to a predetermined channel, such as a channel in a licensed band, but may also be negotiated as part of a protocol used in control data communications, and may be varied as necessary.

The control data generally contains interference-related information, whether in the form of information about the interference such as the type of interferer, frequency, duty cycle, periodicity of the interference and so forth, and/or an interference mitigation solution. This allows a receiving node to pass information about the receiving RF environment (e.g., its remote interference-related information) to a transmitting node, whereby the node can adapt the transmission in some way to improve the chances of better reception based on the control data. The solution may be to change the content channel, in which event the receiver needs to be informed of the change via management data and agree to it, but may be solely implemented at the transmitting node, such as to lower the data transmission rate. Compression may be selectively employed and/or varied as well, such as when interference is effectively reducing the amount of available bandwidth.

Other advantages will become apparent from the following detailed description when taken in conjunction with the drawings, in which:

DETAILED DESCRIPTION

Exemplary Operating Environment

Figure 1:
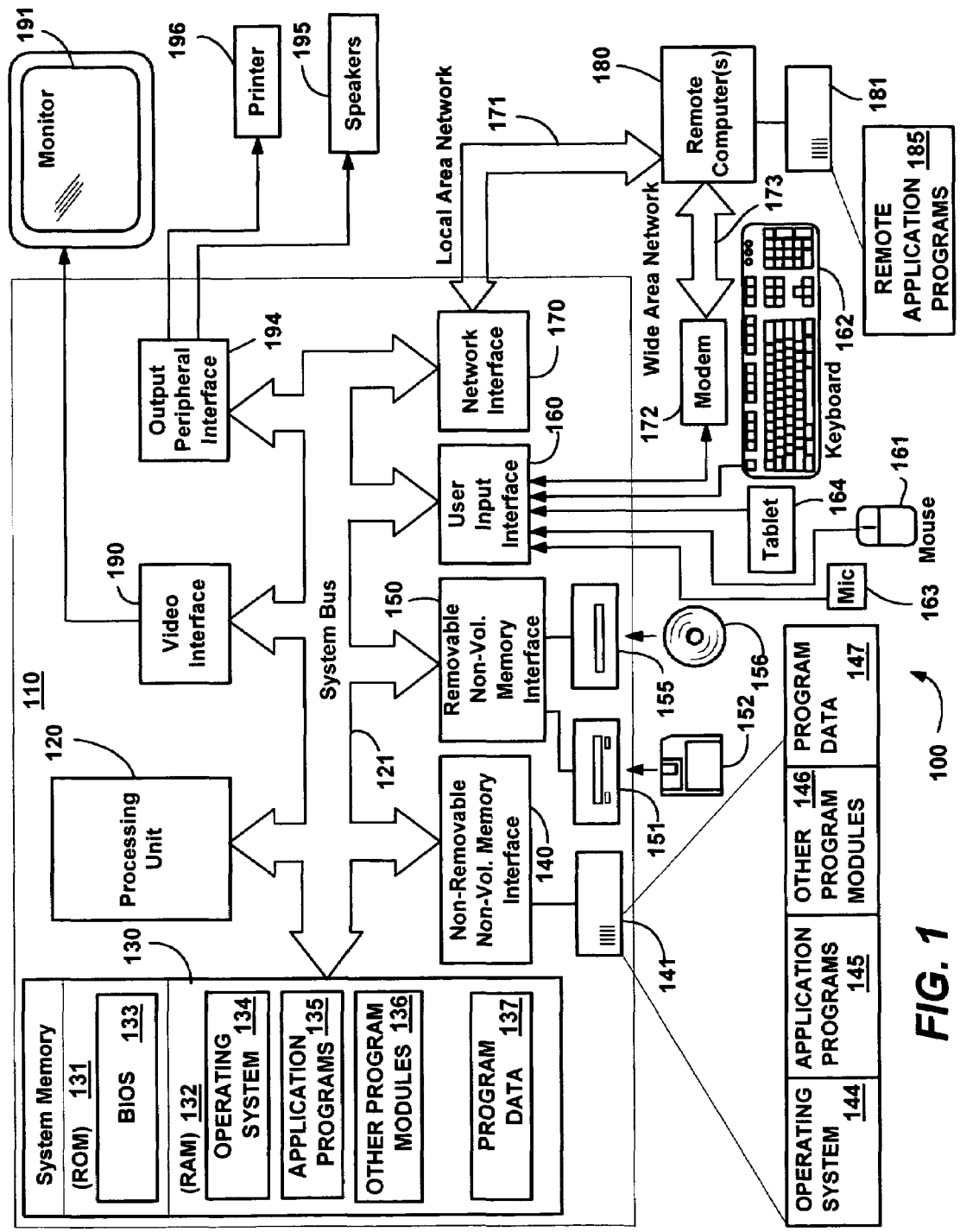
FIG. 1 is a block diagram generally representing a computing environment into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Robust Coexistence Service

The present invention is generally directed towards the use of a separate control channel for communicating interference-related data to another node or nodes in a wireless network. As will be understood, numerous ways to implement the present invention are feasible, and only some of the alternatives are described herein. For example, the present invention is primarily described below with reference to an example framework for use with wireless network communications, into which RF-related sensors, classifiers and application programs plug in to dynamically sense the spectrum and process the sensed data to mitigate the effects of interference on network communications. However, as can be readily appreciated, such a framework is not required to use the present invention, and indeed, the present invention is applicable to other types of communications in addition to wireless network communications that are subject to interference. Moreover, the described example framework may be run on a computer system, but alternatively may be adopted by hardware manufacturers for integration into an access point device, wireless bridge, and so forth. Further, as will be understood, an example protocol is described, however no particular protocol is necessary for communicating interference-related information. As such, the present invention is not limited to any of the particular examples used herein, but rather may be used various ways that provide benefits and advantages in computing in general.

Figure 2:
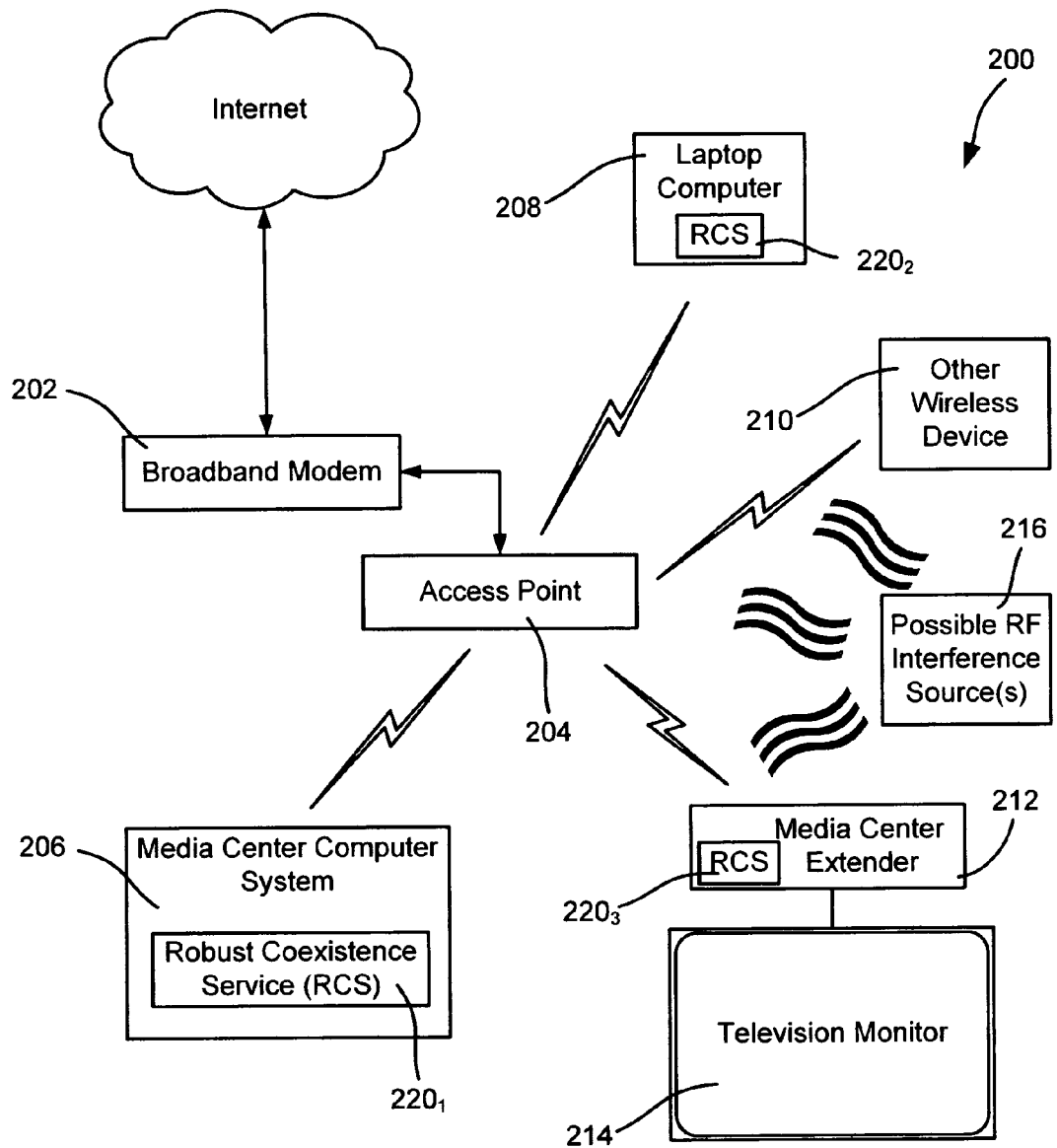
FIG. 2 is a block diagram generally representing an example wireless network including components running instances of the robust coexistence service, in accordance with various aspects of the present invention.

Turning to FIG. 2 of the drawings, there is shown an example wireless network 200 containing wireless devices such as may be found in a home networking environment, but may, of course be used in other environments, and also may be connected to a wired network device or devices. In the example network 200 of FIG. 2, a broadband modem 202 such as a cable modem or DSL modem receives and sends Internet data within the network 200. A wireless access point (wireless router) 204, ordinarily connected by a wired connection (directly or indirectly) to the broadband modem 202, couples the other wireless devices to the broadband router 202 and to one another.

The other wireless devices represented in FIG. 2 include a media computer system 206, a laptop computer 208, some other wireless device 210 such as a different laptop or desktop computer, and a media center extender 212 (similar to a set-top box) that couples audiovisual signals to a television monitor 214. Note that an alternative media center extender may be directly incorporated into the television monitor. FIG. 2 also shows a representation of one or more possible sources of RF interference 216, which may be essentially anything that generates RF transmissions that can cause interference with wireless network communications, whether intentionally operating in the same frequency range, such as with a cordless telephone, or because of noise that results as a side-effect of operating, such as with a microwave oven.

By way of example, consider that the media center 206 streams audiovisual content via the access point 204 to the media center extender 212. While the audiovisual data is being streamed, various non-networking RF sources 216 such as a cordless phone may interfere with the audiovisual stream. As can be readily appreciated, the stream may be interrupted or the bandwidth constrained to such an extent that the media center extender 212 exhausts any buffered data, whereby the user experience is that of a frozen, erratic or otherwise incorrect picture and/or sound. Occasional use of the interfering device, such as is typical with telephone usage patterns, is generally unpredictable and can be even more frustrating to the user.

In accordance with various aspects of the present invention, some of the wireless devices depicted in FIG. 2 include an instance of the robust coexistence service (RCS), shown in FIG. 2 as RCS instances $220_1$-$220_3$. As described below, the robust coexistence service provides a mechanism and framework by which interference-related information may be exchanged between peer devices (nodes) in the network, whereby the negative effects of RF interference on wireless networking may be dynamically mitigated to an extent, or possibly even eliminated, to thereby provide an improved user networking experience.

Figure 3:
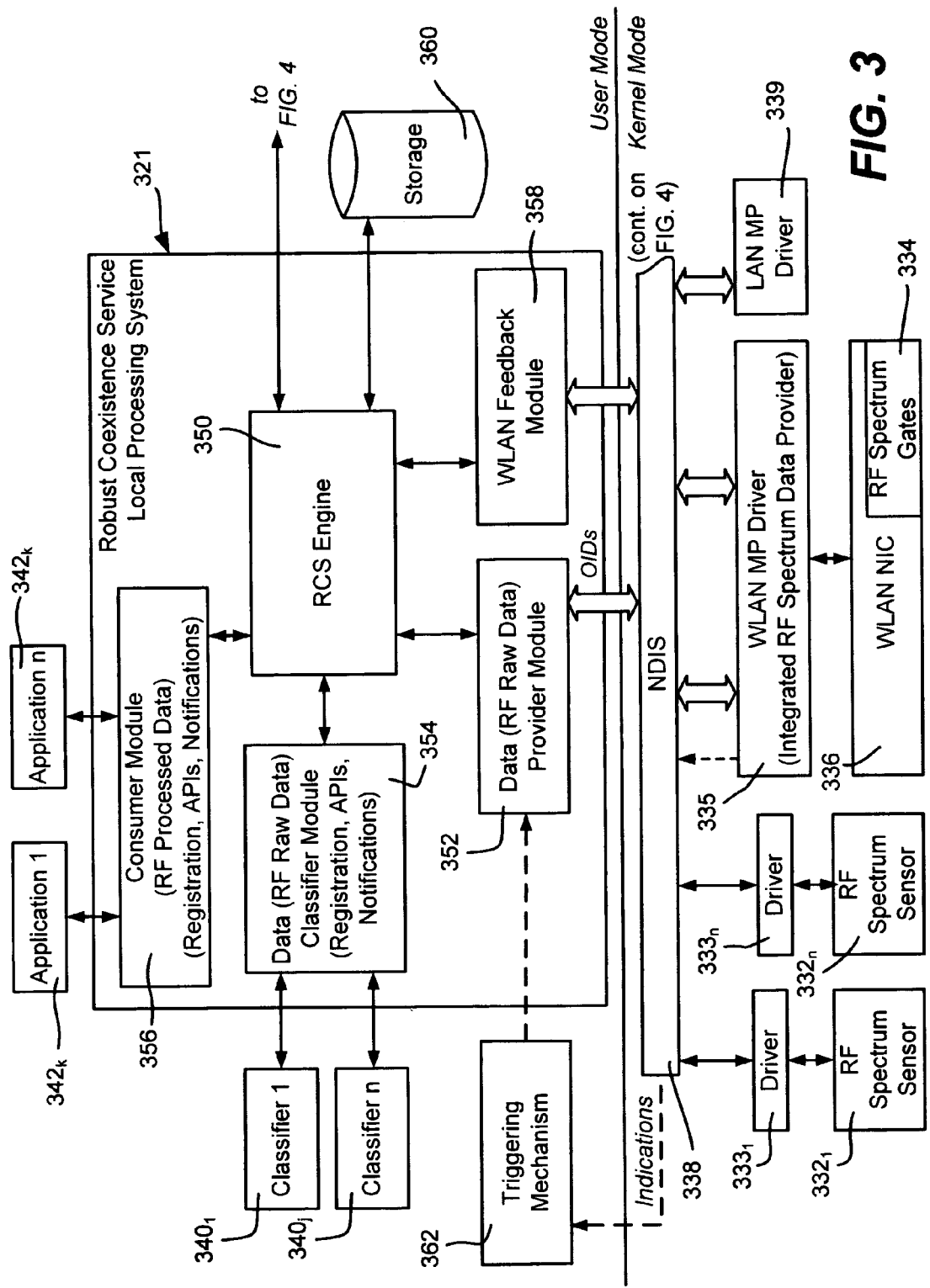
FIG. 3 is a block diagram generally representing components connected to local processing system components of the robust coexistence service, in accordance with various aspects of the present invention.

FIG. 3 shows one component subsystem of a robust coexistence service, referred to as a local processing system 321, along with the local processing system's internal modules and various other modules and resources to which it connects. In general, and as described below, the RCS local processing system 321 interconnects and coordinates the operations of the various external modules that are plugged into the robust coexistence service running on a network node, such as a computer system or an access point, in order to develop mitigation data that may be used to dynamically control the wireless networking components in a way that mitigates the problems caused by interference. To this end, the RCS local processing system 321 interconnects external modules that process spectrum data sensed by local spectrum hardware, e.g., stand-alone hardware and/or hardware integrated into a WLAN chipset, and makes the processed information available for mitigation purposes. Another part of the robust coexistence service, referred to as an RCS information distribution system 421 and described with reference to FIG. 4, coordinates the communication of the control information to other remote devices that are running respective instances of the robust coexistence service, along with handling control information sensed at, processed and received from those remote devices. In other words, the RCS information distribution system 421 provides locally-obtained control data for use by any other remote robust coexistence service for interference mitigation purposes on its corresponding remote node, and obtains remotely-sensed control data for use by the local node for interference-related mitigation.

As represented in FIG. 3, in general, the RF sensing spectrum hardware provides sensed raw RF data to the local processing system 321. More particularly, the spectrum sensing hardware comprises one or more standalone spectrum chips (gates) $332_1$-$332_n$, and/or RF spectrum gates 334 embedded in the WLAN network interface card (NIC) 336 (or similar built-in circuitry), and coupled to an appropriate antenna or the like. As represented in FIG. 3, the spectrum hardware communicates the data via a respective corresponding driver $333_1$-$333_n$ and/or 335 to the local processing system 321, such as through the kernel mode NDIS (Network Driver Interface Specification) interface layer 338 or directly as a spectrum device kernel mode driver, which provides an interface to the user-mode RCS local processing system 321. Note that the robust coexistence service can also be implemented in kernel and also support kernel mode classifiers and kernel mode consumers. For completeness, FIG. 3 also shows a LAN miniport (MP) driver 339 for wired network connections. Note that also for completeness, FIG. 3 shows multiple sensors, e.g., the standalone sensors $332_1$-$332_n$ and their respective drivers $333_1$-$333_n$, along with the RF spectrum gates 334 and corresponding WLAN miniport driver 335 which includes an integrated RF spectrum data provider for handling the RF data; however it can be readily appreciated that more than one RF spectrum sensor is not needed in order to mitigate interference problems. Indeed, as will become apparent, no local sensor is needed on a given system if remotely-sensed RF control data is available to allow mitigation.

The RCS local processing system 321 provides interfaces to internal modules by which external modules, including classifiers $340_1$-$340_j$ and applications $342_1$-$342_k$, may register with the robust coexistence service 321. Note that the miniport drivers $333_1$-$333_n$ may be similarly pluggable through user mode software modules, and need not necessarily go through the NDIS layer 338. As part of registration, the various registering modules identify one or more various types of data that each supports, including data in a pre-defined, generic format understood by any classifier module, and/or data in a proprietary format (treated as blobs when routed to the corresponding classifier). The ability to use a proprietary format allows customized RF sensors and classifiers to be used in the framework. Data types may be a combination of pre-defined generic data and proprietary data type. A mapping is obtained (e.g., in the RCS engine 350) to relate the provider, classifier, consumer and driver in order to identify how a current set of information is to be processed. Identifiers may be used in routing custom data to the correct classifier, as can an evaluation as to whether at least part of the raw data is in the predefined format, in which event any classifier can consume at least part of the raw data. Alternatively, classifiers may receive and discard data they do not understand.

Within the RCS local processing system 321, an RCS engine 350 provides connectivity among its internal modules 352-358, generally routing data as appropriate, as described below. In general, the RCS engine 350 coordinates the activities of the various modules in the service, and also stores classifier data for future use, e.g., in a storage 360. For example, the storage 360 may preserve time-stamped interference classifier information events that may be used for historical analysis.

Via the layered mechanism described above, a data provider module 352 of the system 321 obtains the raw data sensed by the spectrum sensing hardware $332_1$-$332_n$ and/or 334, along with any raw RF data and other lower MAC (media access controller) and PHY (physical) layer device data. From there, the data provider module 352 transfers the raw data to the RCS engine 350 to be forwarded to an appropriate classifier or classifiers (e.g., based on the respective data type or types for which they have registered) for processing into classified data. In one implementation, the data provider module 352 and the drivers may use identifiers (e.g., OIDs or APIs) to pass the raw RF data for consumption by a corresponding classifier or classifiers. As can be readily appreciated, the use of a driver model provides extensibility, as various spectrum sensors may be connected via a corresponding driver, including new ones as developed.

Note that the local processing system 321 may remain idle until needed, that is, until some RF interference is sensed. To awaken the local processing system 321 at the correct time, a triggering mechanism 362 may be used, comprising one or more components that monitor the NDIS layer 338 and provide indications of interference. Further, note that the triggering mechanism 362 may not awaken the local processing system 321 to initiate interference processing until some threshold level of interference is achieved.

To route the RF data to an appropriate classifier, the RCS engine 350 forwards the raw data to a data classifier module 354 of the local processing system 321. In general, the classifier module 354 communicates with the registered classifier or classifiers $340_1$-$340_j$, to provide the raw spectrum data thereto and return processed data, referred to as classified data, for further processing. Note that this also provides for extensibility, as new and/or improved classifiers can simply plug-in as they become available.

In turn, the external classifiers $340_1$-$340_j$, which comprise one or more pluggable modules, essentially look at the raw RF data to determine what is happening in the RF environment. To this end, the classifiers $340_1$-$340_j$ process the raw RF data to perform signature analysis and the like, possibly combining the RF data with other network traffic measurements, to identify the data's relevant characteristics and possibly the source of interference (e.g., cordless phone, microwave oven, Bluetooth device and so forth), and supply such classified data for further action.

A consumer module 356 of the local processing system 321 takes the classified data and (via the RCS engine 350) may store it in the storage 360 and/or route the classified data to registered application programs $342_1$-$342_k$, such as for enunciation of the detected interference as well as for higher-level processing to determine how to adapt the program to avoid the interference. To this end, one or more application programs register with the local processing system 321 to use the classified data to take some action, such as to provide a viewable notification or other indication regarding interference (e.g., a diagnostic application may prompt the user about an RF issue, such as "Cordless phone in use"), and/or, to determine a way to mitigate interference-related communication problems to some extent. For example, the classified data can be used by application programs such as an audio/video streaming application program to reduce the image size of an ongoing transmission, thereby transmitting a lesser amount of A/V streaming data. To this end, the application program may use the classified data as a hint for the application program to conduct its own tests to decide a due course of action in adjusting its behavior.

Note that one application program such as a diagnostic program may handle notifications, and another program may devise its own mitigation solution based on the classified data and any test results. Again, because of the plug-in model for application programs, the framework's extensibility characteristics are readily apparent.

In turn, interference mitigation-related information determined by the robust coexistence service may be passed (e.g., via the RCS engine 350) to a feedback module 358, from where it is communicated to the WLAN miniport driver 335 (or the WLAN NIC 336) for performing dynamic upper-MAC and other adaptations that provide an interference mitigation solution. By way of example, the WLAN miniport driver 335 (or the WLAN NIC 336) can determine from the classified data and internal WLAN data that interference-related problems may be mitigated by changing the frequency to another channel, changing the rate at which data is sent, changing the timing of sending data (such as to avoid interference that starts and stops in a predictable pattern), and in other ways, including combinations of channel, rate and/or timing solutions, switching to another band, staying on the same channel while employing transmission dodging, employing fragmentation to reduce packet size (smaller packets have lower collision chances compared to larger packets and in case of a collision, the cost of retransmission is less due to smaller size of retransmission), and so forth.

Figure 4:
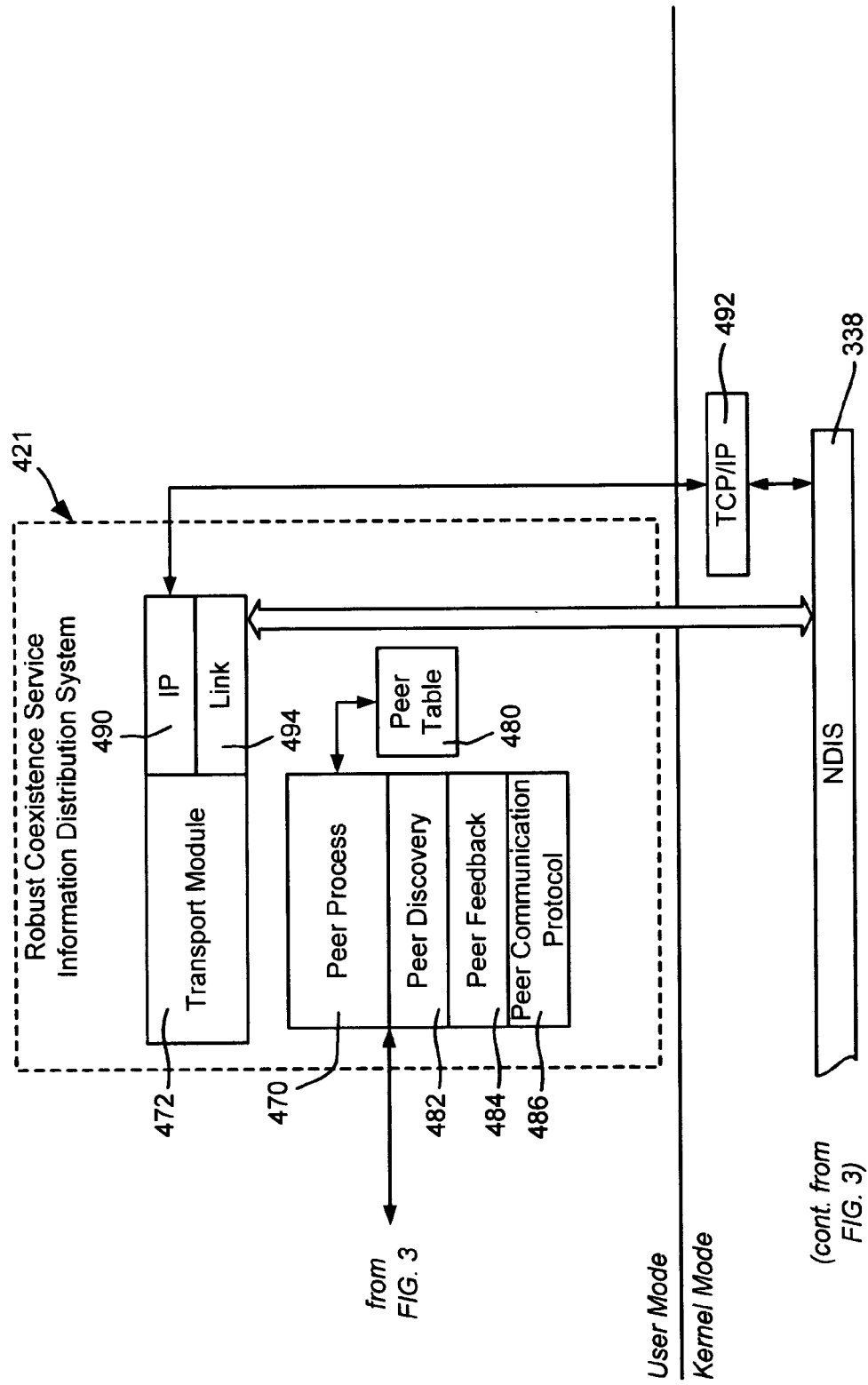
FIG. 4 is a block diagram generally representing components connected to information distribution system components of the robust coexistence service, in accordance with various aspects of the present invention.

Turning to FIG. 4, as mentioned above, another subsystem component of the robust coexistence service comprises an information distribution service 421 that communicates interference information sensed at the local computer system to other remote devices on the network, and receives similar information sensed remotely, for use in locally mitigating interference. As represented in FIG. 4, the information distribution service 421 includes a peer process 470 and a transport module 472.

The peer process manages a peer table 480 and performs tasks including peer discovery 482, peer feedback 484 and also manages peer communication via a suitable communication protocol 486. In general, peer discovery 482 may use Plug-and-Play (uPnP) technology to discover the wireless nodes that participate in the robust coexistence service, such as handling current audiovisual streams.

Peer feedback 484 is used to communicate the RF environment and other characteristics of each node using the agreed-upon protocol, with updates at appropriate times such as upon interference detection and/or at selected intervals. The communication protocol 486 defines the method, format and the type of RF environment and other characteristics of each node that are to be distributed among the nodes. One suitable protocol is described in the related U.S. patent application Ser. No. 11/004,428, entitled, "Protocol for Exchanging Control Data to Mitigate Interference Problems in Wireless Networking."

The transport module 472 distributes corresponding protocol packets. One way to transport the packets is to use the IP 490 and the TCP/IP 492 layers, via wired or wireless LANs. Another way is to use a link layer via WLAN or another wireless technology using the same or another wireless band. As described herein, a benefit of using a separate channel for exchanging the control information is that the channel in use for regular data communication may be unable to exchange such control information at times of interference, and thus the control data is also not available for use in mitigation.

Figure 5:
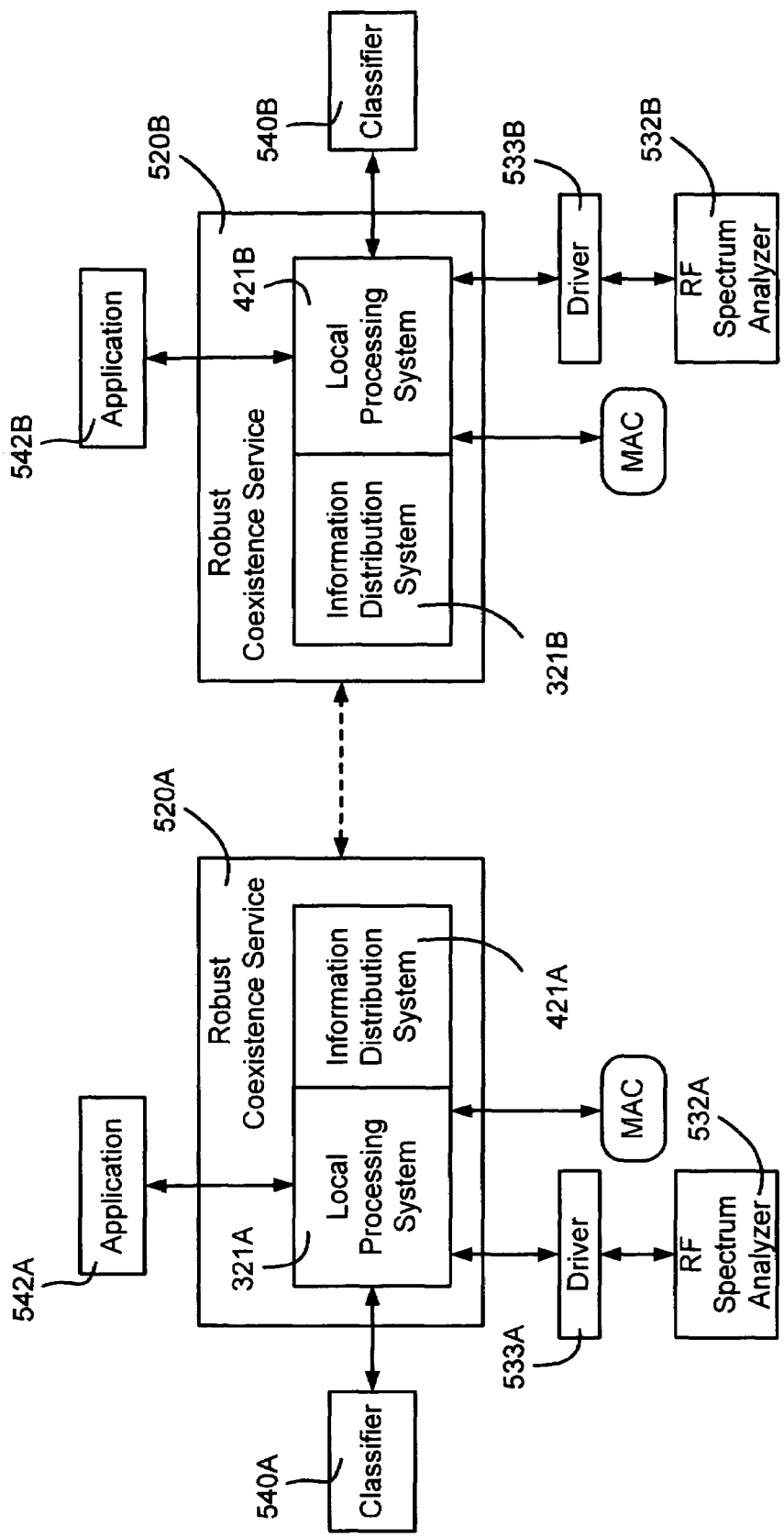
FIG. 5 is a block diagram generally representing two instances of the robust coexistence service communicating sets of RF-related information with one another, in accordance with various aspects of the present invention.

As represented in FIG. 5, in a distributed wireless network with multiple wireless nodes, each node can have one or more spectrum chips 532A and 532B, and a respective instance of an associated robust coexistence service 520A and 520B. Each node may thus aggregate classifier information using its respective information distribution system 421A, 421B, treating other nodes as remote peers.

Another aspect is local peers, enabling collective processing by RCS-enabled wireless nodes, which is based on another robust coexistence-like service running on the same wireless node. This is alternatively represented in FIG. 5, if instead of being considered separate nodes, the services are considered as peers connected and running on the same node. For example, in an environment having more than one spectrum chip (in which a per-chip robust coexistence-like service) is being run on the same node, the robust coexistence services 520A and 520B may communicate via their respective information distribution sub-systems 421A and 421B, where they are peers to each other, but local peers, not remote peers.

Figure 6:
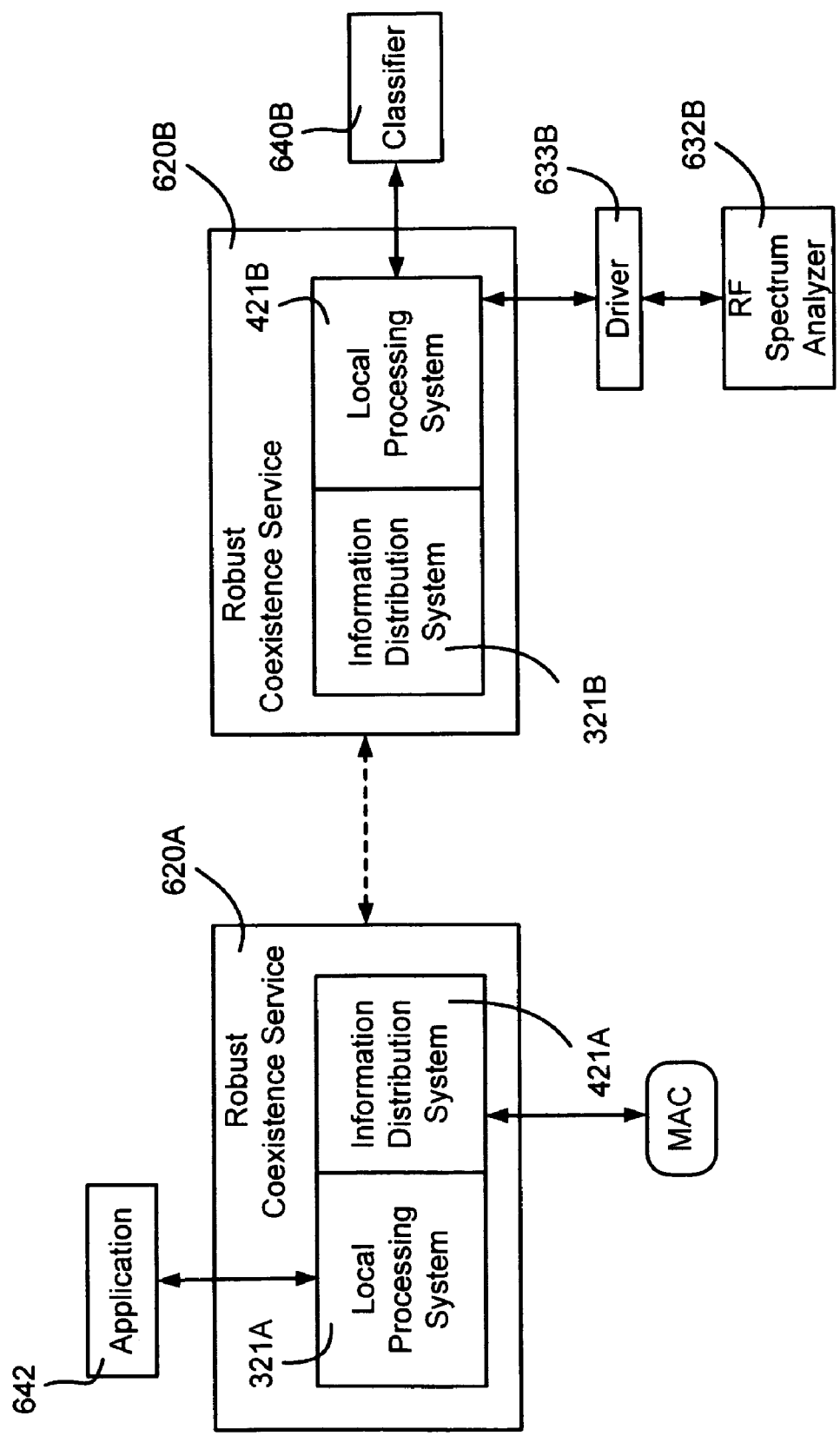
FIG. 6 is a block diagram generally representing two separated instances of the robust coexistence service, where only one of the services has a set of sensed RF-related information, and communicates it to the other service, in accordance with various aspects of the present invention.

Moreover, combining robust coexistence-like services on the same node provides the option of obtaining one fully functional set of components, even if, for example, each robust coexistence service does not have a full set of components that would make it fully functional by itself. Thus, FIG. 6 shows that the application program 642 interfaced to the robust coexistence-like service 620A, along with the MAC connected thereto, complement the classifier 640B, driver 633B and RF spectrum analyzer 632B connected to the robust coexistence service 620B to provide full functionality.

Figure 7:
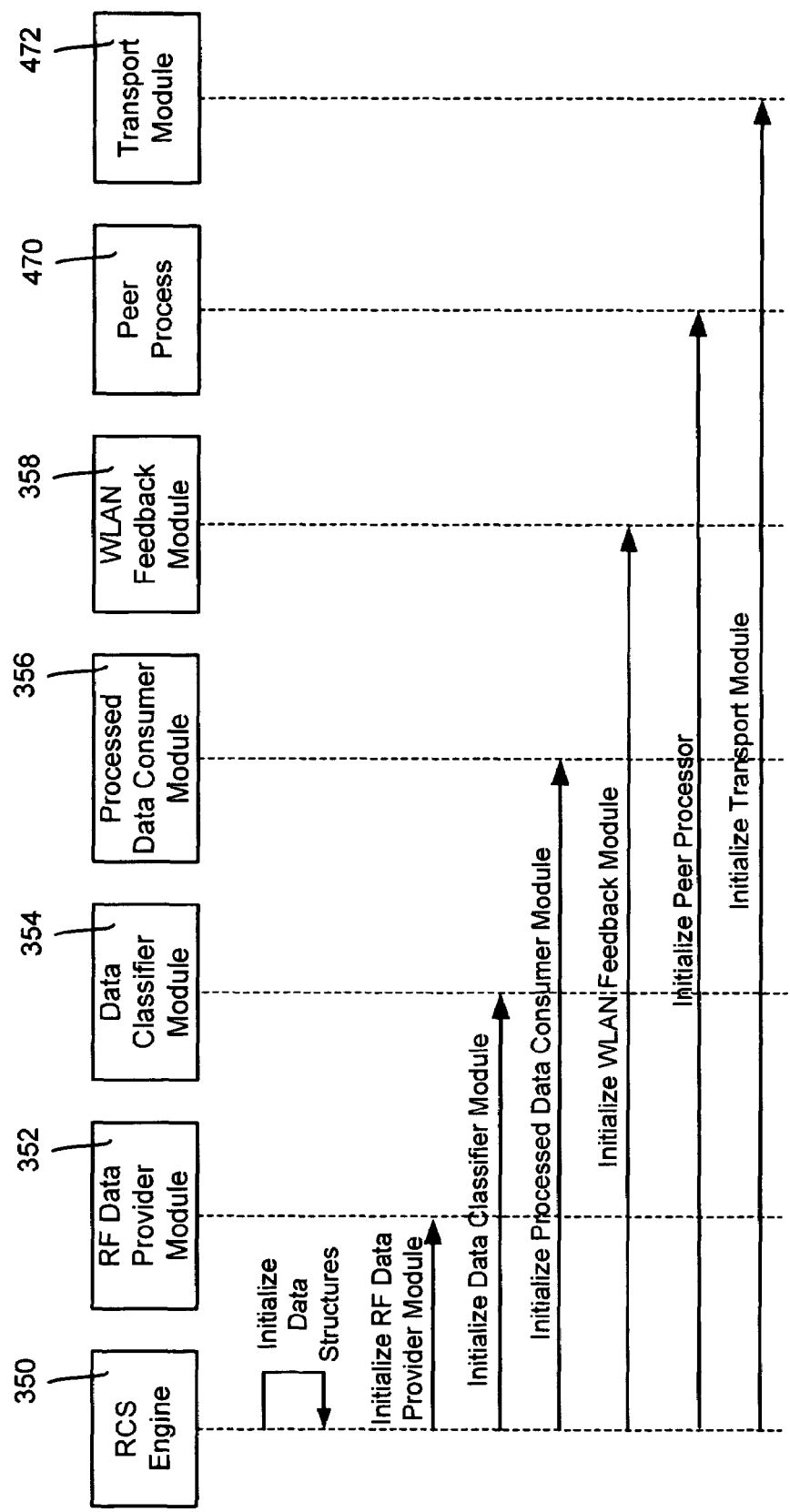
FIGS. 7-10 comprise representations of an example ordering of various robust coexistence service operations, in accordance with various aspects of the present invention.

Turning to an explanation of the basic operation of the robust coexistence service 320, FIG. 7 represents an example over time (not to any scale) that shows the initialization of the various internal modules of the robust coexistence service 320. As can be appreciated, the ordering is not important unless information is needed from one module's initialization to startup and/or completely initialize another. Thus, FIG. 7 represents the robust coexistence service 320 starting the RCS engine 350, and initializing the various other modules, e.g., the RF data provider module 352, the data classifier module 354, the data consumer module 356 and the WLAN feedback module 358. Also, the peer process 470 and transport module 472 are initialized.

Figure 8:
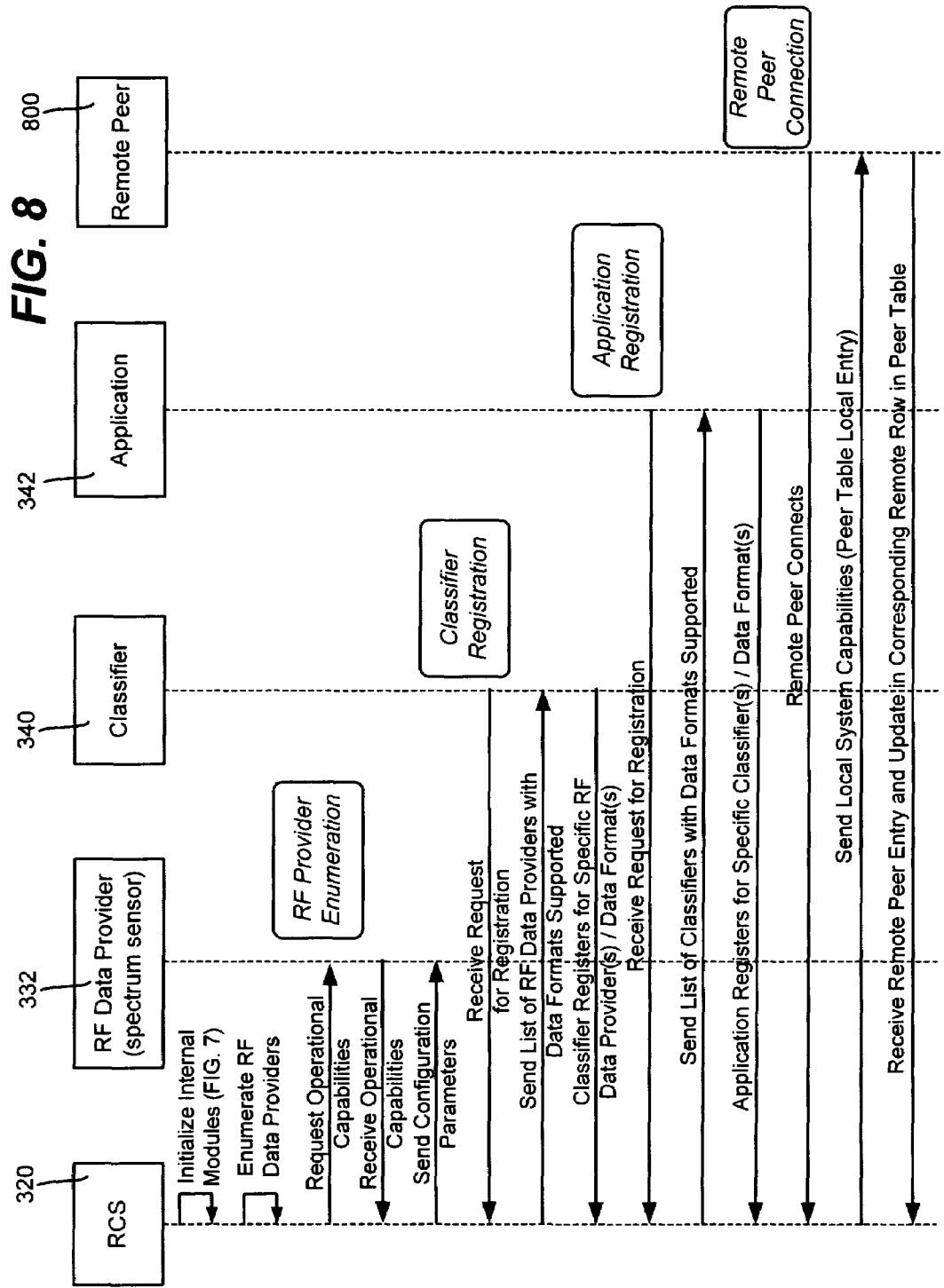

FIG. 8 shows, following internal initialization, the enumeration and registration with an RF spectrum sensor (RF data provider) 332 via its respective driver. The robust coexistence service 320 may select and set the operating parameters of the RF data provider 332, (e.g., bandwidth to detect, channel detection sequence, detection interval and so forth).

As also represented in FIG. 8, the robust coexistence service 320 registers each requesting classifier (e.g., 340), and provides it with a list of the RF spectrum sensors/data providers that were enumerated. In response the data classifier module receives a specific registration request for one or more RF data providers on the list. Application registration and connection to a remote peer 800 are also represented in FIG. 8.

Figure 9:
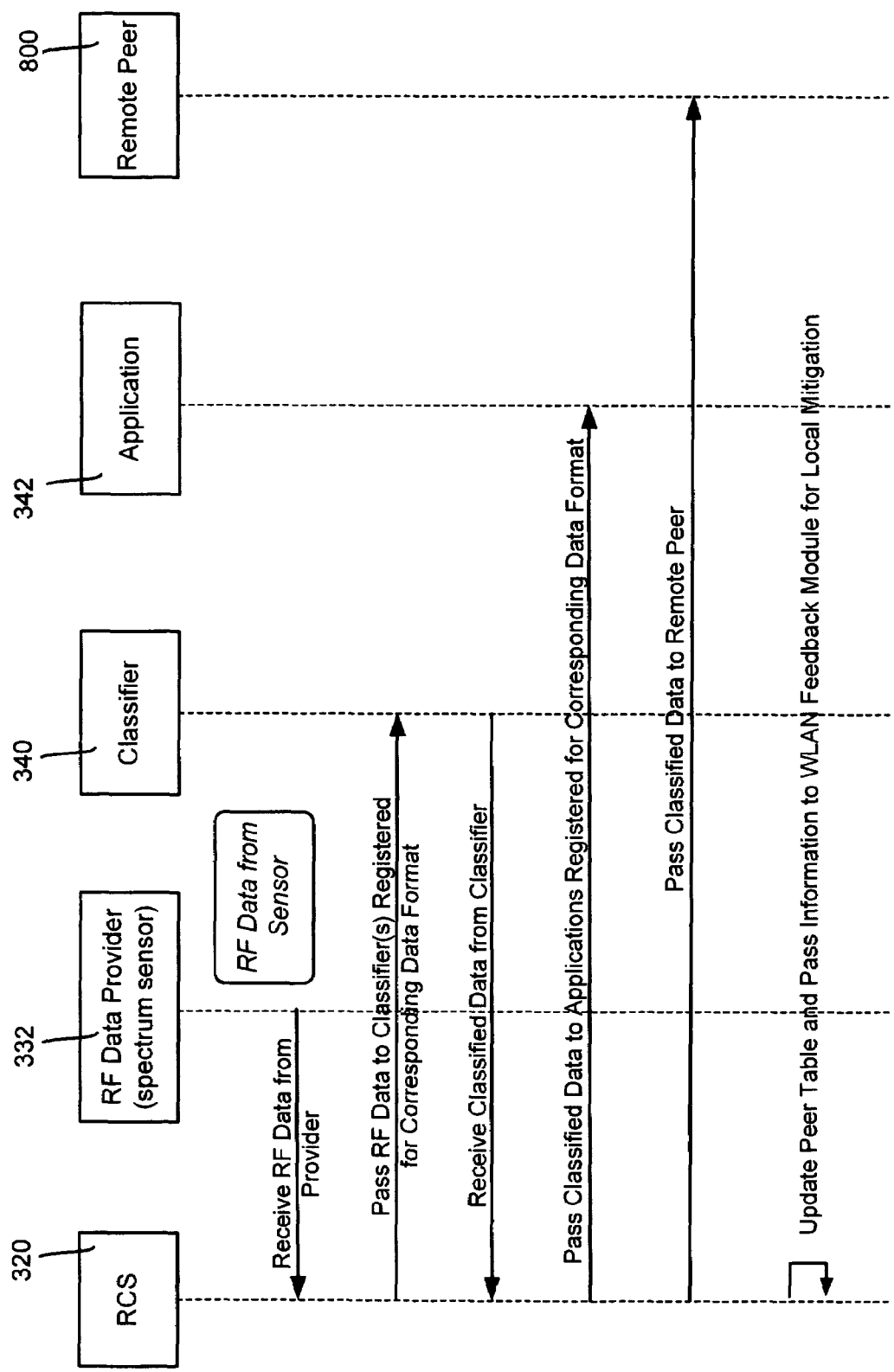

FIG. 9 reiterates the operations when data is received from an RF sensor 332. As described above, the data is provided to an appropriately-registered classifier (e.g., 340), with classified data returned and then forwarded to an appropriately-registered application program 342. Corresponding control data may be passed to any remote peers such as the remote peer 800, and the local peer table updated with local control data based on the classified data. Mitigation information (e.g., as calculated by the robust coexistence service 320 based on the classified data, or the classified data itself) is then sent to the feedback module for use in adjusting the networking parameters to mitigate the interference problem, as described above.

Figure 10:
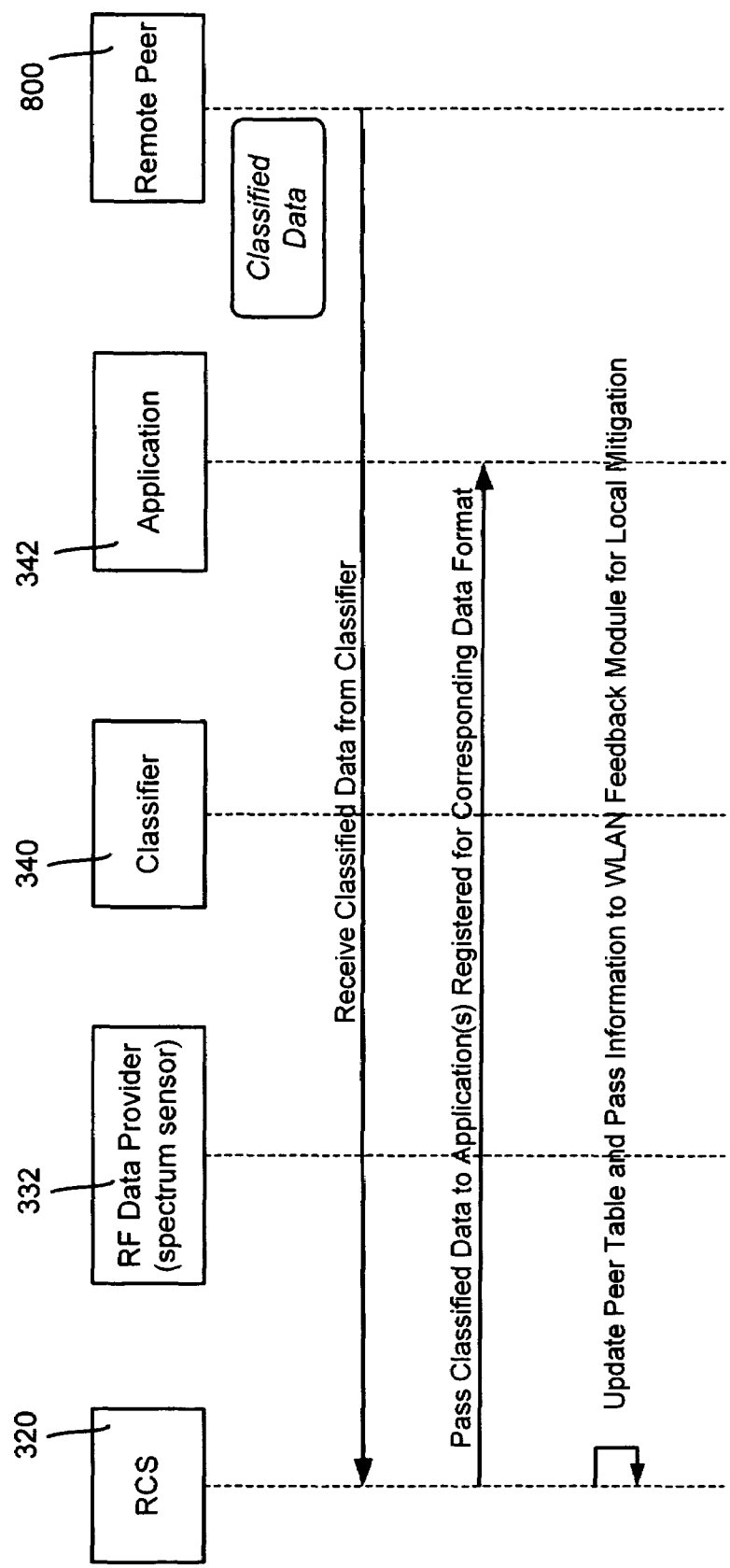

FIG. 10 shows the operations when classified data is received from a remote peer 800. As represented in FIG. 10, this remotely-obtained classified data is passed to the appropriate application program 342 or WLAN miniport Driver 335 (or WLAN NIC 336), which uses the processed data to dynamically adjust the networking parameters to mitigate the interference problem. The peer table is also updated.

Use of Separate Control Channel for Control Data

The present invention is generally directed towards a system and method for transporting interference-related control data and other information between two or more nodes in a wireless network, by using a control channel that is separate from the content (main data) channel used to transport content. While the present invention provides numerous benefits with WLANs, such as WLANs commonly referred to as operating in the 2.4 GHz or 5 GHz bands, the present invention is also applicable to other types of communications environments where interference is a problem. For example, any unlicensed band, such as containing the citizens band channels used for short range radio communications, may likewise benefit from having a control channel for dynamically changing channels and the like to avoid interference. Thus, the present invention may be extended to any wireless transmission system that currently uses an unlicensed band.

In general, the control channel is selected so as not to be subject to the same interference-related problems that are detected on the unlicensed content channel. Otherwise, the control data could not be successfully communicated either, and no mitigation actions could be taken. A way to guarantee that the control channel does not experience interference (in ordinary environments) is to select a channel in the licensed band. Such selection may be done in advance, and the channel fixed if desired, although different channels within the licensed band will be available and thus a dynamic mechanism that selects the control channel from among others in the licensed band may be used.

As can be readily appreciated, communicating the relatively small amount of control data uses little bandwidth relative to the amount of bandwidth often needed by the content channel. As such, the control data may be communicated on a control channel that is among one or more channels used for other purposes as well. For example, contemporary and future computing devices are implementing Smart Personal Object Technology (SPOT) radios, which operate in the licensed band, and thus for little expense the present invention may be implemented in such devices by using the already-present SPOT radios and their already-licensed frequencies to communicate the control data. Notwithstanding, any multiple frequency (e.g., dual-radio) device may implement the present invention.

When a licensed band solution is unacceptable, various alternatives for selecting a different unlicensed control channel are feasible, including selecting the control channel as a different channel in the same unlicensed band as the content channel or selecting the control channel as a channel in a different band (e.g., a channel in the 5 GhZ band instead of in the 2.4 GHz band used for content communications, or vice-versa). Again, because the bandwidth requirements are low and a different channel is being used for the control data, the control data is often able to be exchanged in the unlicensed band even when the unlicensed content channel is experiencing interference. As with the licensed band alternative, in the unlicensed band, the control data can also be used to change its own communication parameters, including changing the control channel to another frequency.

Figure 11:
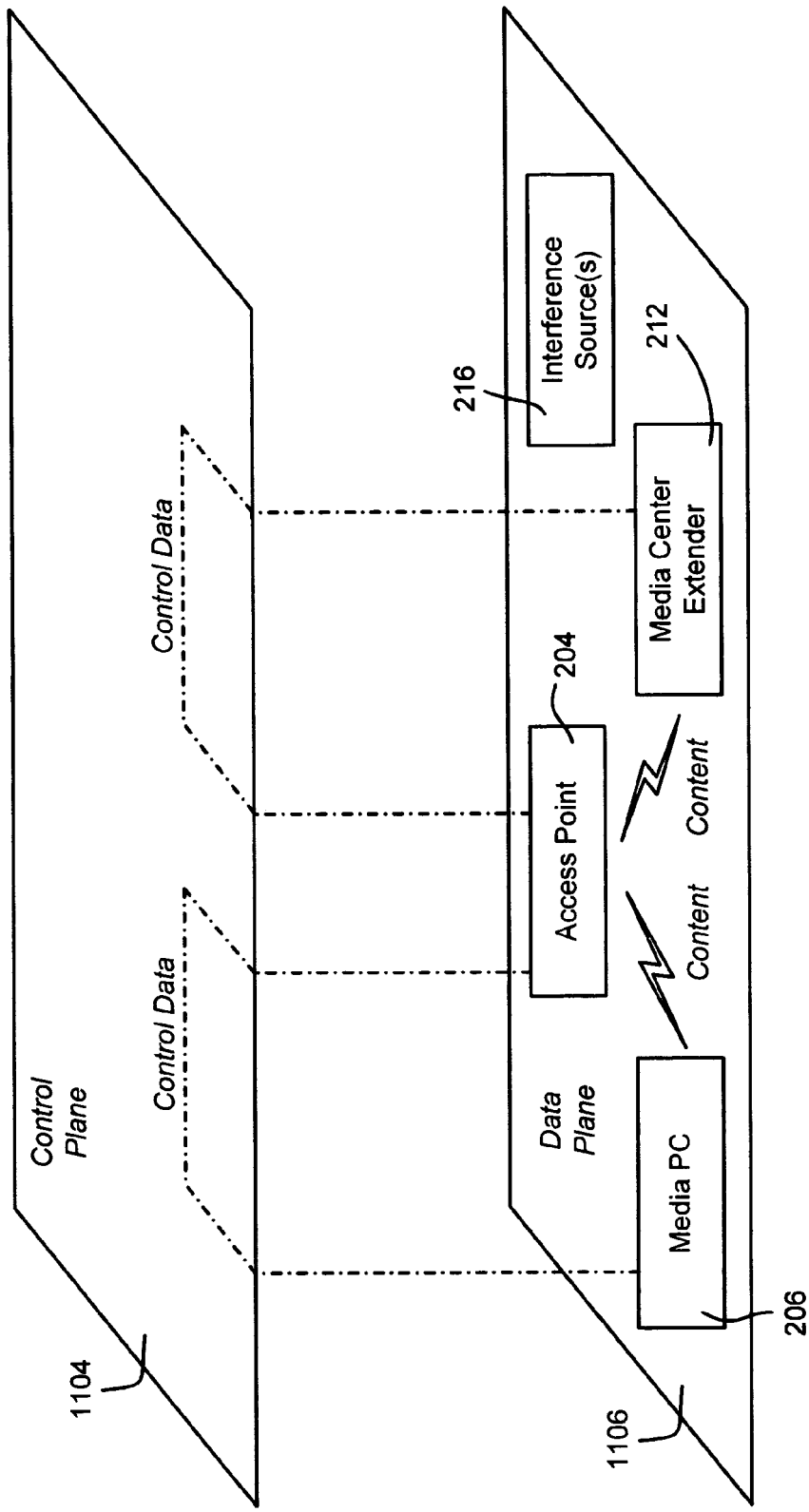
FIG. 11 is a representation showing different control and data planes for communicating information in a wireless network including control data and content, in accordance with various aspects of the present invention.

FIG. 11 is a representation illustrating an aspect of the present invention using the concept of a data plane 1106 for content communications and a control plane 1104 for control data communications, along with some of the components represented in FIG. 2. As represented in FIG. 11, the interferences sources 216 operate on the data plane 1106, however the control data is sent on the control plane 1104 therefore not experiencing the interference. Although not shown in FIG. 11, if the control data is used to move the data communications between the media PC 206, the access point 204 and the media center extender 212 to another data plane (frequency), the interference sources 216 on the former data plane 1106 are avoided.

Figure 12:
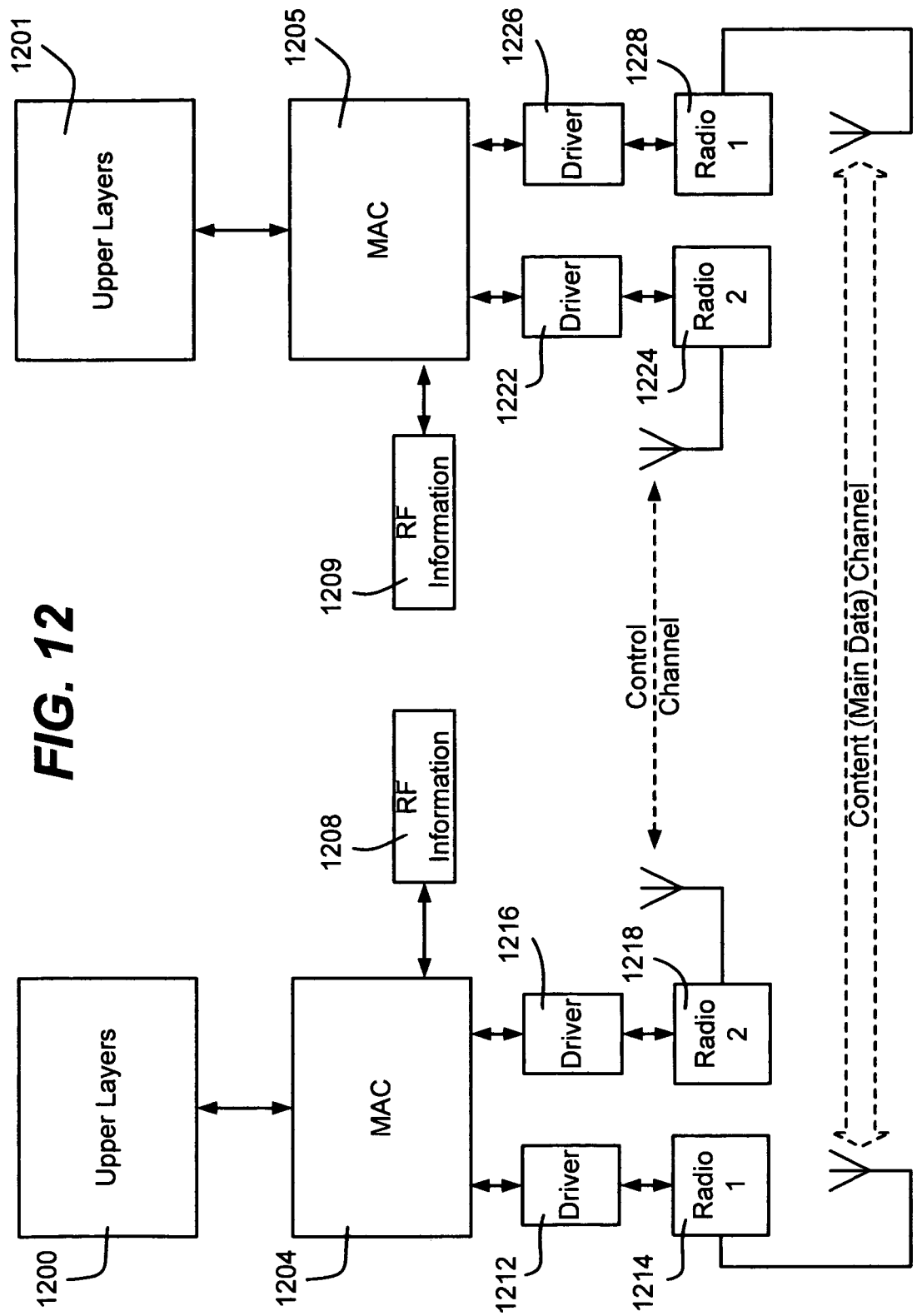
FIG. 12 is a block diagram showing components in wireless nodes configured to communicate content on a main data channel and control data on a control channel, in accordance with various aspects of the present invention.

FIG. 12 is a block diagram representing two communicating nodes in a wireless communications environment, including upper layers 1200 and 1201 (e.g., the components shown in FIGS. 3 and 4) above the MAC layers 1204 and 1205. As described above, respective sets of RF information 1208 and 1209 may be sensed at each node, and used to develop the control data via the classifiers and application programs plugged into the framework, as also described above.

With the control information, FIG. 12 shows how distinct radios with corresponding drivers separately communicate the control data and the content data. Thus, in a first node, driver 1212 works with radio 1 (labeled 1214) to transmit content data to a corresponding radio 1 (labeled 1224) on a second other node, which via its corresponding driver 1222 receives the data, and vice-versa with respect to transmission and reception.

In keeping with the present invention, on the second node, a driver 1216 works with a radio 2 (labeled 1218) to transmit content data to a corresponding radio 2 (labeled 1228) on the second node, which via its corresponding driver 1226 receives the data. Communication of the control in the other direction uses the same components.

As a result, regardless of interference on the content channel, control data comprising management information (e.g., interference-related data) and the like may still be communicated between nodes on the control channel. By using the control data, such as to dynamically vary the content transmission in some way to mitigate or avoid the problems being caused by the interference, a better user experience results. For example, via management information sent over the control channel can be processed to change the content channel to another frequency. Compression may be used or varied in its type to pass more data with less bandwidth, such as if the available bandwidth is narrowed by the interference; note that the receiver need not be informed if a decompression algorithm already in use need not change, such as if the compression algorithm provides degraded audio and/or visual information during times of interference. Similarly, the rate of transmitting the data may be slowed down or halted during times of interference, relying, for example, on a buffer at the receiving end to hold enough information to be slowly depleted until the data rate can be increased to refill the buffer. Note that such a mitigation solution would be valuable when dealing with regular spikes of interference; other useful work may be accomplished during such spikes rather than sending data that is likely to be lost.

The control data generally contains interference-related information, whether in the form of information about the interference such as the type of interferer, frequency, duty cycle, periodicity of the interference and so forth, and/or an interference mitigation solution. This allows a receiving node to pass information about the receiving RF environment (e.g., its remote interference-related information) to a transmitting node, whereby the node can adapt the transmission in some way to improve the chances of better reception based on the control data. The solution may be to change the content channel, in which event the receiver needs to be informed of the change via management data and agree to it, but may be solely implemented at the transmitting node, such as to lower the data transmission rate.

Although the control channel is described with wireless examples, it is also feasible to have other types of control channels in a given environment. For example, because the control channel is low bandwidth, in a home environment it is feasible to use the electrical power outlets or phone jacks in a home or the like to exchange control data among devices that are wired in this way. Infrared is another wireless option when there is line of sight, as is FM when only low power is needed for communication.

Lastly, other information beyond interference related/mitigation information may be communicated. For example, security-related data may be exchanged, (even though the control channel may not be secure). Consider that the access points and associated devices store multiple encryption keys; the control channel may be used to inform the devices as to which key is in use at any time. Also, frequency changes to the data channel and/or the control channel can be randomly initiated rather than in response to interference, as could changes to a compression algorithm. Any uninvited party listening on the data channel will also have to listen on the control channel in order to keep up with frequency changes, encryption key changes and so forth, which adds another level of difficulty to eavesdropping.

CONCLUSION

As can be seen from the foregoing detailed description, there is provided a system and method for transporting interference-related control data and other information between nodes in a wireless network, using a control channel that is separate from the main content channel. The control channel, which may be in a licensed band, is not ordinarily subject to the same interference as experienced by the unlicensed content channel. Based on the control data, wireless communication mechanisms may dynamically adapt to mitigate communication problems caused by interference on the main content channel, resulting in an improved wireless experience.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a peer-to-peer network, a method of mitigating communication interference in an unlicensed wireless band used to exchange content data between two peer devices by using a control channel to exchange control data between the two peer devices in order to dynamically vary the unlicensed wireless communication, the method comprising:
    establishing a peer-to-peer communication between two devices;
    transmitting between the two devices content data on a main data channel in the unlicensed band;
    providing a control channel, different from the main channel, for transferring control data directly between the two devices such that control data sent from one of the two devices is specifically directed at another;
    exchanging control data directly between the two devices on the control channel, the control data including interference-related information for managing the transmission of the content data on the main data channel, and wherein the exchange includes both a transmission and reception of the control data by each of the two devices and directed at each other, which allows each of the two devices to know the radio frequency environment of each other for the peer-to-peer communication between the two devices on the main data channel in the unlicensed band; and
    varying at least one parameter that performs an action to mitigate interference-related communication problems on the main data channel based on the exchange of the control data.

2. The method of claim 1 wherein the control channel for transferring control data is a channel in a licensed band.

3. The method of claim 1 wherein the control channel for transferring control data is a channel in an unlicensed band.

4. The method of claim 3 wherein the control channel for transferring control data is a different channel in the same unlicensed band.

5. The method of claim 3 wherein the control channel for transferring control data is a in a different unlicensed band.

6. The method of claim 1 wherein varying at least one parameter comprises varying compression of data sent on the main data channel.

7. The method of claim 1 wherein varying at least one parameter comprises varying change a frequency of transmission on the main data channel.

8. The method of claim 1 wherein varying at least one parameter comprises varying a rate of data sent on the main data channel.

9. At least one computer storage medium having computer-executable instructions, which when executed perform the method of claim 1.

10. In a peer-to-peer network, a method of mitigating communication interference in an unlicensed wireless band used to exchange content data between two peer devices by using a control channel to exchange control data between the two peer devices in order to dynamically vary the unlicensed wireless communication, the method comprising:
    establishing a peer-to-peer communication between two nodes in a network;
    communicating content data between the two nodes, on a first main data channel in the unlicensed band;
    providing a control channel, the control channel being different from the first main data channel and operating for transferring of control data directly between the two nodes such that control data sent from one of the two nodes is specifically directed at the other node;
    exchanging control data on the control channel and directly between the nodes, the control data including interference-related information related to the communication of the content data on the first main data channel, and wherein the exchanging of control data includes both a transmission and reception of the control data by each of the two nodes and directed at each other, which allows each of the nodes to know the radio frequency environment of each other for the peer-to-peer communication between the two devices on the first main data channel in the unlicensed band; and
    based on the exchanging of control data between the nodes via the control channel, changing the first main data channel to a second main data channel in the unlicensed band in order to mitigate interference-related communication problems on the main channel.

11. The method of claim 10 wherein the control data includes interference-related information, and wherein exchanging the control data is performed to mitigate interference problems with communications on the first main channel.

12. The method of claim 10 wherein exchanging the control data comprises communicating on a channel in a licensed band.

13. The method of claim 10 wherein exchanging the control data comprises communicating on a channel in an unlicensed band.

14. The method of claim 13 wherein communicating on the channel in the unlicensed band channel comprises selecting a channel in the same unlicensed band as the main data channel that is different from the main data channel.

15. The method of claim 14 wherein communicating on the channel in the unlicensed band channel comprises selecting a channel in a different unlicensed band from the unlicensed band of the main data channel.

16. The method of claim 10 further comprising exchanging the control data to vary compression of content data transmitted on the main data channel.

17. The method of claim 10 further comprising exchanging the control data to vary a rate of transmitting content data on the main data channel.

18. At least one computer storage medium having computer-executable instructions, which when executed perform the method of claim 1.

19. In a wireless communication environment, a system configured to mitigate communication interference in an unlicensed wireless band used to exchange content data between peer-to-peer devices by using a control channel to exchange control data and dynamically vary the unlicensed communication, the system comprising:
- a plurality of nodes in a peer-to-peer system that communicate directly with one each other, each node comprising:
  - a main content transmission mechanism including a first radio that transmits content on an unlicensed content channel to at least one other node; and
  - a control transmission mechanism including a second radio that transmits control data on a control channel that is in a licensed band and different from the content channel, the control channel allowing the second radio to transmit control data specifically directed to other peer nodes, and the control data including interference-related information that can be exchanged directly between the nodes such that an exchange of the control data, which exchange includes both a transmission and reception of the control data by each of the two peer nodes, allows each node to know the radio frequency environment of each other for communication on the main data channel that is in the unlicensed content channel; and
- wherein the peer nodes exchange the control data directly therebetween to vary communication of the content in order to mitigate problems caused by interference on the content channel.

20. The system of claim 19 wherein in order to mitigate problems caused by interference on the content channel, the nodes communicate the control data to change the content channel.

* * * * *